United States Patent [19]
King et al.

[11] 3,966,486
[45] June 29, 1976

[54] HIGH TEMPERATURE PIGMENTED COATINGS BASED ON ZIRCONIUM PHOSPHINATE POLYMER BINDERS CROSSLINKED WITH PHOSPHINIC ACIDS

[75] Inventors: James Ping King, Lansdale; Joseph Simkin, Lafayette Hill; Peter F. Radice, King of Prussia, all of Pa.

[73] Assignee: Pennwalt Corporation, Philadelphia, Pa.

[22] Filed: July 1, 1974

[21] Appl. No.: 484,523

[52] U.S. Cl. ............... 106/287 R; 260/37 R; 260/2 M; 260/2 P; 260/860; 260/901; 260/22 CQ; 260/42.22
[51] Int. Cl.² ............... C08L 85/02; C09K 3/00
[58] Field of Search ............... 260/429.3, 2 M, 2 P, 260/37 M, 37, 22 CQ, 860, 961, 42.22; 106/287 R, 287.3; 117/127

[56] References Cited
UNITED STATES PATENTS

| | | | |
|---|---|---|---|
| 3,224,908 | 12/1965 | Duch | 117/127 |
| 3,455,731 | 7/1969 | Nielson | 117/127 |
| 3,654,189 | 4/1972 | Venezky | 260/2 P |

FOREIGN PATENTS OR APPLICATIONS

| | | |
|---|---|---|
| 1,040,560 | 9/1966 | United Kingdom |

OTHER PUBLICATIONS

Chem. Abst., 64:892b.

*Primary Examiner*—Theodore Morris

[57] ABSTRACT

Improved coatings having resistance to high temperature degradation are obtained by modifying a zirconium phosphinate polymer with phosphinic acid and a pigment. Acrylate or alkyd resins may also be included in the formulation.

7 Claims, No Drawings

HIGH TEMPERATURE PIGMENTED COATINGS BASED ON ZIRCONIUM PHOSPHINATE POLYMER BINDERS CROSSLINKED WITH PHOSPHINIC ACIDS

This invention relates to compositions containing polymers of zirconium phosphinates useful as protective coatings having resistance to high temperature oxidative and thermal degradation, and to the coatings produced therewith.

Zirconium phosphinate polymers of the repeating unit $Zr(OH)_2(OPRR^1O)_2$, where R and $R^1$ are independently selected from the group consisting of alkyl, aryl, alkoxyl or aryloxyl radicals, preferably having from 1 to 12 carbon atoms, for example, methyl, ethyl, propyl, isopropyl, butyl, hexyl, octyl, phenyl, tolyl, xylyl, naphthyl and the like, are known and are described in such publications as Chem. Ber. 95, 1203 (1962), British Pat. No. 1,040,560, British Patent 1,016,821, and Journal Inorganic Nuclear Chemistry 31, 3685 (1969). However, coatings that have been made from these polymers, for example, when applied to a metallic substrate from solution in a solvent, then followed by evaporation of the solvent, are inadequate because they are permeated with deep cracks, can be easily scratched with a fingernail, and are almost powderlike in consistency.

The compositions of this invention are comprised of a mixture of the zirconium phosphinate polymer of the repeating unit $Zr(OH)_2(OPRR^1O)_2$, where R and $R^1$ are as defined above and are most preferably selected from the group consisting of methyl, ethyl, phenyl and tolyl; a pulverulent pigment selected from the group consisting of aluminum, zinc, the alkali metal and alkaline earth metal titanates, zinc oxide, magnesium oxide, and the alkali metal and alkaline earth metal silicates, but preferably selected from the group consisting of titanium dioxide, zinc oxide, barium titanate, aluminum and zinc; and a phosphinic acid represented by $R^2R^3P(O)OH$ where $R^2$ and $R^3$ are independently selected from the group consisting of alkyl, aryl, alkoxyl, or aryloxyl radicals, preferably having from 1 to 12 carbon atoms, for example, methyl, ethyl, propyl, isopropyl, butyl, hexyl, octyl, phenyl, tolyl, xylyl, phenyl ether, phenyl sulfone, trifluoromethyl, and are preferably selected from the group consisting of methyl, phenyl, phenyl ether and phenyl sulfone. (It is understood that the $R^2$ and $R^3$ radicals, as well as the R and $R^1$ radicals, may be substituted with such substituents as fluorine, chlorine, sulfone, carboxyl, hydroxyl, amino and mercapto.)

The proportions of the foregoing constituents in the compositions of the invention are, based on 100 parts by weight of the zirconium phosphinate polymer, from about 25 to about 75 parts by weight of the phosphinic acid and from about 230 to about 330 parts by weight of the pigment. The preferred proportions are from about 40 to 60 parts of phosphinic acid and from about 270 to 290 parts pigment. The zirconium phosphinate polymer will generally have a molecular weight within the range of about 20,000 to about 100,000 preferably from 30,000 to 50,000. The most preferred polymers are those selected from the group wherein the repeating unit is $Zr(OH)_2[OP(Me)(Ph)O]_2$ or $Zr(OH)_2[OP(Ph)_2O]_2$ where Me represents methyl and Ph represents phenyl. The most preferred phosphinic acids for use herein are those selected from the group consisting of $(Ph)_2P(O)OH$, $Me(Ph)P(O)OH$, $(PhSO_2C_6H_4)(Ph)P(O)OH$, and $(C_8H_{17})_2P(O)OH$.

The most convenient way of applying coatings comprised of the foregoing mixture to metal substrates, for example to steel, aluminum, titanium, etc., is from a mixture with solvent for the zirconium polymer and the phosphinic acid and in which the pigment will be suspended. The solvent can be a single organic liquid or can be a mixture of organic liquids, such as, for example, selected from the group consisting of benzene, methanol, chloroform, 2-propanol, dimethyl formamide, tetrahydrofuran, dioxane, cyclohexanone, methyl ethyl ketone, acetone, dimethyl acetamide, toluene, xylene, and the like. The amount of solvent can range from about 490 to about 1400 parts per 100 parts by weight of the phosphinate polymer. The coatings are applied to the metal substrate by conventional means, e.g., spraying, doctor-blade coating, dipping or brushing and then air dried at ambient temperature to evaporate the solvent and cure the coating, or at elevated temperatures, for instance 150°C. The coatings thus formed afford corrosion protection and high temperature protection for the metallic substrate; and are resistant to thermal and oxidative degradation at temperatures ranging up to about 1000°F., making the coatings useful in such applications as coatings for automotive, aviation and marine engines, industrial motors, missiles, projectiles and aerospace hardware. It is believed that the superior properties of the compositions and coatings embodied herein are due to a crosslinking reaction effected between the polymer, the phosphinic acid, and the pigment. Surprisingly, these good properties are not obtained with structurally analogous chromium phosphinate polymers.

In other embodiments of this invention, the compositions will have incorporated therein from about 15 to about 100 parts, per 100 parts by weight of the zirconium polymer, of a resin selected from the group consisting of acrylate polymer resins and alkyd resins. The preferred ranges of said acrylate and alkyd resins are from about 45 to 75 parts per 100 parts of zirconium polymer. Typical acrylate resins are those polymers derived from the monomers having the structure

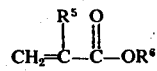

where $R^5$ is selected from the group consisting of hydrogen and methyl, and $R^6$ is lower alkyl, that is, an alkyl radical containing from one to four carbon atoms. The preferred acrylate which will be employed in the invention is polymethylmethacrylate, although copolymers of two or more different monomers of the above structure are useful, as are also the copolymers obtained from a monomer of the above structure with other ethylenically unsaturated compounds. Useful copolymer will be those containing from 10 to 40%, preferably from 10 to 20% by weight, of a comonomer, and such comonomers, including those having the above structure, are exemplified by acrylic acid, methacrylic acid, acrylontrile, methylacrylate, ethylacrylate, ethylmethacrylate, butylacrylate, butylmethacrylate, styrene, a-methyl styrene, and the like. The preferred acrylate copolymer compositions will be a copolymer of methylmethacrylate and butylmethacrylate. The above acrylic polymers are the well known acrylic thermoplastic resins, but this invention also embodies the use of the recently developed acrylic thermosetting resins. The thermosetting acrylic resins incorporate cross-linking sites and upon the application of heat, they cure to the final resin. Such acrylics also may embody other thermosetting resins such as epoxides, melamine, urea-formaldehyde compositions and the like and these modified acrylics are also useful in the invention. The conventional alkyd resins useful herein are exemplified by the polymeric esters products obtained by the reaction of polyhydric alcohols and polybasic acids, usually modified by the incorporation of monobasic fatty acid, which is preferably complemented by the addition of a triglyceride (oil) for more fatty acid component. Representative alkyd ingredients are as follows:

| Polybasic acids | Oils |
|---|---|
| phthalic anhydride | linseed |
| isophthalic acid | soya |
| maleic anhydride | dehydrated castor |
| fumaric acid | tung |
| azelaic acid | fish |
| succinic acid | safflower |
| adipic acid | oiticica |
| sebacic acid | cottonseed |
| | coconut |
| Polyhydric alcohols | |
| glycerol | trimethylolpropane (2-ethyl-2-(hydroxymethyl)-1,3-propanediol) |
| pentaerythritol | |
| dipentaerythritol | |
| trimethylolethane (2-(hydroxymethyl)-2-methyl-1,3-propanediol) | ethylene glycol |
| | propylene glycol |
| sorbitol | neopentylene glycol (2,2-dimethyl-1,3-propanediol) |
| | dipropylene glycol |
| Monobasic acids | |
| fatty acids and fractionated fatty acids obtained from oils | |
| tall-oil fatty acids | |
| synthetic saturated fatty acids | |
| pelargonic | |
| isodecanoic | |
| isooctanoic | |
| 2-ethylhexanoic | |

Alkyd resins are described in some detail in Kirk-Othmer's Encyclopedia of Chemical Technology, 2nd Edition, Vol. 1 (1963), pp 851–880.

The effect of incorporating the acrylate polymer or alkyd resin into the composition embodied herein in the aforesaid proportions is to impart to the coatings prepared therefrom improved optical properties, i.e., no cracks; improved abrasion resistance; better wet adhesion; and better gloss at lower cure temperatures, without detracting from the overall thermal resistance of the coatings.

The operation and advantages of the invention are clarified and demonstrated by the following illustrative examples.

EXAMPLE 1

A solution of 2.18 g (0.005 mole) of polymer (believed to have a molecular weight on the order of about 30,000) of the repeating unit $Zr(OH)_2[OP(CH_3)(Ph)O]_2$ in 40 g. benzene, 5 g. chloroform and 5 g. 2-propanol, in admixture with 2.18 g. (0.005 mole) $TiO_2$ pigment is sprayed onto titanium alloy (Ti-6Al - 4V) panels and permitted to air dry at ambient temperature. Similarly, an identical solution to which 1.09 g (0.005 mole) $Ph_2P(O)OH$ is added is used to prepare spray coatings on titanium alloy panels. Coatings are also prepared with a separate solution containing 1.79 g (0.005 mole) of $(PhSO_2C_6H_4)(PH)P(O)OH$ in place of $Ph_2P(O)OH$. Results of observations on the coatings (1 to 3 mils thick) are given in Table I, below.

TABLE I

Appearance and Properties of Coatings
Phosphinic Acid Additive:

| | None | $Ph_2P(O)OH$ | $(PhSO_2C_6H_4)(Ph)P(O)(OH)$ |
|---|---|---|---|
| Color | white | white | white |
| Gloss | dull | slight | glossy |
| Microscopic appearance | poor-mudcracks, powdery | excellent-smooth and continuous | good-some hairline cracks |
| Hardness (fingernail) | poor | good | excellent |
| Adhesion | poor | fair | good |

EXAMPLE 2

Coating compositions based on a zirconium phosphinate polymer of the repeating unit $Zr(OH)_2[OP(CH_3)(Ph)O]_2$ and titanium dioxide pigment, with and without phosphinic acid additive, are prepared having the following compositions in parts by weight. Sample A is the control composition.

| | A | B |
|---|---|---|
| Zirconium phosphinate polymer | 50.0 | 27.5 |
| $TiO_2$ pigment | 50.0 | 22.5 |
| Phosphinic Acid $Ph(PhSO_2C_6H_4)(P(O)OH)$ | None | 50.0 |
| Solvents: | Parts by weight | |
| Benzene | 73.0 | |
| Chloroform | 9.0 | |
| 2-propanol | 9.0 | |
| Dimethylformamide | 9.0 | |

The compositions are applied to Ti-6AL-4V panels and are cured at 150°C. to give coatings 1 to 3 mils in thickness. The coatings are subjected to thermal tests from room temperature up to 932°F. The results are summarized in Tables II and III.

TABLE II

Control Composition (A) Coating Properties

| Observations | R. T. | 392°F. | 572°F. | 662°F. | 752°F. | 932°F. |
|---|---|---|---|---|---|---|
| Time[1] | 16 | 2 | 2 | 2 | 2 | 2 |
| Color[2] | white | white | white | white | yellowing | grey |
| Gloss[2] | dull | dull | dull | dull | dull | dull |
| Microscopic appearance | poor[5] | poor[5] | poor[5] | poor[5] | poor[5] | poor[5] |
| Hardness[3] | poor | poor | poor | poor | poor | poor |

TABLE II-continued

| Observations | Control Composition (A) Coating Properties | | | | | |
|---|---|---|---|---|---|---|
| | R. T. | 392°F. | 572°F. | 662°F. | 752°F. | 932°F. |
| Adhesion[4] | poor | poor | poor | poor | poor | poor |

[1] Length of exposure to temp., hr
[2] Visual
[3] Fingernail
[4] Cross-cut Tape Test
  > 90% remaining - excellent
  80–90% remaining - good
  70–80% remaining - fair
  < 70% remaining - poor
[5] Mud cracks, powdery

TABLE III

| Observations | Composition (B) Coating Properties | | | | | |
|---|---|---|---|---|---|---|
| | R. T. | 392°F. | 572°F. | 662°F. | 752°F. | 932°F. |
| Time[1] | 16 | 2 | 2 | 2 | 2 | 2 |
| Color[2] | white | white | white | yellowing | tan | off-white yellowing |
| Gloss[2] | glossy | slight | dull | dull | dull | dull |
| Microscopic appearance | good[5] | good | good | good | good | good[6] |
| Hardness[3] | excellent | excellent | excellent | excellent | excellent | excellent |
| Adhesion[4] | good | good | good | good | good | excellent |

[1] Length of exposure to temp,. hr
[2] Visual
[3] Fingernail
[4] Cross-cut Tape Test
  > 90% remaining-excellent
  80–90% remaining-good
  70–80% remaining-fair
  < 70% remaining-poor
[5] Hairline cracks
[6] Mud cracks

EXAMPLE 3

Scrapings from a coating from a coating of the composition composed of 23.4 parts of zirconium phosphinate polymer of the repeating unit $Zr(OH)_2[OP(CH_3)(Ph)O]_2$; 65 parts of $TiO_2$ pigment; and 11.6 parts of phosphinic acid of the formula $Ph_2P(O)OH$ are subjected to thermogravimetric (TGA) analysis in air. Scrapings of a coating of a silicone-based composition known as AF66, which is used as a protective thermal coating by the U.S. Air Force, also are subjected to comparative TGA analysis. The results, summarized in Table IV, show the superiority of the phosphinate polymer coatings.

TABLE IV

| Composition | Temp.[1], °C Init. | Weight Loss | | | Residue at 700°C. (%) |
|---|---|---|---|---|---|
| | | 5% | 10% | 20% | |
| Phosphinate polymer coating | 410 | 500 | 525 | 580 | 78 |
| Silicone-based Coating | 260 | 375 | 440 | 510 | 45 |

[1] Heating rate, 5°C/min.

EXAMPLE 4

A coating formulation is prepared as follows and designated as Sample C.

| Formulation, parts by weight | C |
|---|---|
| Phosphinate polymer of the repeating unit $Zr(OH)_2[OP(Me)(Ph)O]_2$ | 3.06 |
| Phosphinic acid $(Ph)_2P(O)OH$ | 1.52 |
| $TiO_2$ Pigment | 8.50 |
| Dimethyl formamide (DMF) | 6.00 |
| Methanol (MeOH) | 6.00 |
| Benzene | 18.00 |

Another formulation (Sample D) is prepared with the same ingredients except that an alkyd resin is added in an amount of 50 parts per 100 parts of zirconium phosphinate polymer and phosphinic acid.

| Formulation, parts by weight | D |
|---|---|
| Polymer of the repeating unit $Zr(OH)_2[OP(Me)(Ph)O]_2$ | 3.06 |
| $Ph_2P(O)OH$ | 1.52 |
| Duraplex ND77B* alkyd Resin | 3.77 |
| $TiO_2$ | 8.5 |
| DMF | 6.0 |
| MeOH | 6.0 |
| Benzene | 18.0 |

*Phthalic anhydride-coconut oil type resin, 60% solution in xylene. (Product of Rohm & Haas Co.)

Another formulation (Sample E) is prepared with the same ingredients except that an acrylate polymer is added in an amount of 33 parts per 100 parts of zirconium phosphinate polymer and phosphinic acid.

| Formulation, parts by weight | E |
|---|---|
| Polymer of repeating unit $Zr(OH)_2[OP(Me)(Ph)O]_2$ | 3.06 |
| $Ph_2P(O)OH$ | 1.52 |
| Acryloid B44* acrylate resin (40% by Xylene) | 3.77 |
| $TiO_2$ | 8.5 |

-continued

| Formulation, parts by weight | E |
|---|---|
| DMF | 6.0 |
| MeOH | 6.0 |
| Benzene | 18.0 |

*A copolymer of ethyl acrylate and methyl methacrylate, predominantly the latter, product of Rohm & Haas Co.

Coatings (1-1.3 mil thick) are applied to titanium panels as in Example 1 and evaluated for high temperature resistance. The data, summarized in the following Table V, show that the thermal resistant coatings, comprised of zirconium phosphinate polymer, phosphinic acid and pigment, are improved in certain respects by the incorporation of the alkyd or acrylic resins. Further Examples of coatings of the invention using other representative pigments are set forth as Samples F and G.

TABLE V

| | SAMPLE C | | | |
|---|---|---|---|---|
| | R. T. | 150°C. | 300°C. | 540°C. |
| Pencil Hardness | 3H | 3H | 3H | 8H |
| Gloss 60° | 58 | 49 | 20 | 9 |
| Thickness$^a$ | 1.1 | 1.0 | 1.1 | 0.8 |
| Abrasion$^b$ | .1320 | .1312 | .1432 | .1360 |
| Optical$^c$ | cracks | cracks | cracks | large cracks |
| Wet Adhesion | poor | fair | fair | excellent |

$^a$Permascope
$^b$Taber, $\frac{\text{Wt. loss} \times 1000}{500 \text{ cycles}}$
$^c$100 × magnification

TABLE V

| | SAMPLE D | | | |
|---|---|---|---|---|
| | R. T.$^d$ | 150°C. | 300°C. | 540°C. |
| Pencil Hardness | 3H | 5H | 7H | >9H |
| Gloss | 86 | 60 | 10 | 4 |
| Thickness$^a$ | 1.3 | 1.0 | 0.75 | .70 |
| Abrasion$^b$ | 0.1384 | 0.1056 | 0.1392 | 0.0560 |
| Optical$^c$ | good | good | good | few long cracks |
| Wet Adhesion | good | good | fair | excellent |

$^a$Permascope
$^b$Taber, $\frac{\text{Wt. loss} \times 1000}{500 \text{ cycles}}$
$^c$100 × magnification
$^d$R. T. signifies room temperature

TABLE V

| | SAMPLE E | | | | |
|---|---|---|---|---|---|
| | R. T.$^d$ | 150°C. | 300°C. | 540°C. | 540°C.$^e$ |
| Pencil Hardness | 3H | 7H | 7H | >9H | >9H |
| Gloss | 27 | 19 | 5 | 4 | — |
| Thickness$^a$ | 1.0 | 0.8 | 0.65 | 0.5 | — |
| Abrasion$^b$ | 0.1072 | 0.0992 | 0.0936 | 0.1328 | — |
| Optical$^c$ | good | good | good | chipped | cracks |
| Wet Adhesion | good | good | good | excellent | — |

$^a$Permascope
$^b$Taber, $\frac{\text{Wt. loss} \times 1000}{500 \text{ cycles}}$
$^c$100 × magnification
$^d$R. T. signifies room temperature
$^e$Gradual heating (300°C. for 2 hr, then 540°C. for 2 hr)

Sample F

Composition and Evaluation of Coating with 50 pph Alkyd Resin and ZnO (50% of Pigment)
Formulation, parts by weight    Evaluation Data on Ti-6Al-4V Titanium Panels

| | | | r.t.$^d$ | 150°C | 300°C | 540°C |
|---|---|---|---|---|---|---|
| Polymer of repeating unit Zr(OH)$_2$[OP(Me)(Ph)O]$_2$ | 3.06 | Pencil Hardness | 2H | 6H | 7H | >9H |
| Ph$_2$P(O)OH | 1.52 | Gloss | 61 | 38 | 5 | 4 |
| Duraplex ND77B Alkyd Resin | 3.77 | Thickness$^a$ | 1.0 | 0.9 | 0.65 | 0.5 |
| TiO$_2$ | 4.5 | Abrasion$^b$ | 0.1400 | 0.0992 | 0.1040 | 0.0088 |
| ZnO | 4.0 | Optical$^c$ | good | good | good | good$^e$ |
| DMF | 12 | Wet Adhesion | good | good | poor | excellent |
| Cyclohexanone | 5 | | | | | |
| Methyl ethyl ketone (MEK) | 16 | | | | | |

$^a$Permascope
$^b$Taber, $\frac{\text{Wt. loss} \times 1000}{500 \text{ cycles}}$
$^c$100 × magnification
$^d$r.t. signifies room temperature
$^e$chipped around edges but no cracks observed Sample G Composition and Evaluation of Coating with 50 pph Alkyd Resin and Aluminum Pigment
Formulation (grams)    Evaluation Data on Ti-6Al-4V Titanium Panels

| | | | r. t.$^d$ | 150°C | 300°C | 540°C$^e$ |
|---|---|---|---|---|---|---|
| Polymer of repating unit Zr(OH)$_2$[OP(Me)(Ph)O]$_2$ | 3.06 | Pencil Hardness | 4H | 7H | >9H | >9H |
| Ph$_2$P(O)OH | 1.52 | Gloss 60° | 16 | 11 | 11 | 9 |
| Duraplex ND77B Alkyd Resin | 3.77 | Thickness$^a$ | 0.6 | 0.65 | 0.5 | 0.4 |
| Al No. 1593 (Alcoa) Aluminum pigment | 4.7 | Abrasion$^b$ | 0.0864 | 0.0784 | 0.0704 | 0.0136 |
| DMF | 6 | Optical$^c$ | good | good | good | good |
| MeOH | 6 | Wet Adhesion | good— | good | fair+ | fair+ |
| Benzene | 18 | | | | | |

$^a$Permascope
$^b$Taber, $\frac{\text{Wt. loss} \times 1000}{500 \text{ cycles}}$

Sample G-continued

| Composition and Evaluation of Coating with 50 pph Alkyd Resin and Aluminum Pigment | | | | |
|---|---|---|---|---|
| Formulation (grams) | Evaluation Data on Ti-6Al-4V Titanium Panels | | | |
| | r. t.[d] | 150°C | 300°C | 540°C[e] |

[c]100 × magnification
[d]r. t. signifies room temperature
[e]Gradual heating (300°C for 2 hr, 540°C for 2 hr)

We claim:

1. A composition comprised of a mixture of a zirconium phosphinate polymer of the repeating unit Zr(OH)$_2$(OPRR$^1$O)$_2$, a phosphinic acid of the formula R$^2$R$^3$P(O)OH, where R, R$^1$, R$^2$ and R$^3$ are independently selected from the group consisting of alkyl, aryl, alkoxyl, and aryloxyl radicals, having 1 to 12 carbons and a pigment selected from the grou consisting of aluminum, zinc, the alkali metal and alkaline earth metal titanates, zinc oxide, magnesium oxide, and the alkali metal and alkaline earth metal silicates, there being in the composition from about 25 to about 75 parts by weight of the phosphinic acid and from about 230 to about 330 parts by weight of the pigment per 100 parts by weight of the zirconium phosphinate polymer.

2. A composition in accordance with claim 1 which has incorporated therein from about 15 to about 100 parts, per 100 parts by weight of the zirconium phosphinate polymer, of a resin selected from the group consisting of acrylate polymer resins and alkyd resins.

3. A composition according to claim 1 wherein there are from about 40 to 60 parts of phosphinic acid and from about 270 to 290 parts of pigment.

4. A composition according to claim 3 which has incorporated therein from about 45 to 75 parts, per 100 parts by weight of the zirconium phosphinate polymer, of a resin selected from the group consisting of acrylate polymer resins and alkyd resins.

5. A composition according to claim 1 wherein the pigment is selected from the group consisting of titanium dioxide, zinc oxide, barium titanate, aluminum and zinc.

6. A comosition according to claim 1 in which the zirconium phosphinate polymer is of the repeating unit Zr(OH)$_2$[OP(Me)(Ph)O]$_2$.

7. A composition according to claim 1 in which the zirconium phosphinate polymer is of the repeating unit Zr(OH)$_2$[OP(Ph)$_2$O]$_2$.

* * * * *